United States Patent
Mecayten et al.

(10) Patent No.: US 12,282,450 B2
(45) Date of Patent: Apr. 22, 2025

(54) SYSTEM AND METHOD FOR INTELLIGENT AND CONDITIONAL CLOUD SCREEN RECORDING

(71) Applicant: Nice Ltd., Ra'anana (IL)

(72) Inventors: Ofir Mecayten, Karkur (IL); Gil Nakash, Modiin (IL); Yaron Cohen, Modiin (IL)

(73) Assignee: Nice Ltd., Ra'anana (IL)

( * ) Notice: Subject to any disclaimer, the term of this patent is extended or adjusted under 35 U.S.C. 154(b) by 0 days.

(21) Appl. No.: 18/233,969

(22) Filed: Aug. 15, 2023

(65) Prior Publication Data

US 2025/0061081 A1 Feb. 20, 2025

(51) Int. Cl.
*G06F 16/11* (2019.01)

(52) U.S. Cl.
CPC .................. *G06F 16/113* (2019.01)

(58) Field of Classification Search
CPC .................................................. G06F 16/113
See application file for complete search history.

(56) References Cited

U.S. PATENT DOCUMENTS

| | | | |
|---|---|---|---|
| 8,510,399 B1* | 8/2013 | Byttow | H04L 12/1822 707/771 |
| 2018/0246797 A1* | 8/2018 | Modi | G06Q 10/06398 |
| 2019/0028557 A1* | 1/2019 | Modi | G06F 21/316 |
| 2019/0108419 A1* | 4/2019 | Coven | G06F 8/60 |
| 2019/0121501 A1* | 4/2019 | Laska | H04W 12/02 |
| 2021/0157834 A1* | 5/2021 | Sivasubramanian | G06F 16/686 |
| 2023/0315998 A1* | 10/2023 | Sundaram | G06F 40/253 704/9 |

\* cited by examiner

*Primary Examiner* — Dangelino N Gortayo
(74) *Attorney, Agent, or Firm* — PEARL COHEN ZEDEK LATZER BARATZ LLP

(57) ABSTRACT

A method of managing interaction recordings of an interaction between agent devices and customer devices, the method comprising: initiating an interaction recording of the interaction between an agent device and a customer device, wherein the interaction recording comprises metadata items; storing one or more parts of the interaction recording in a local storage; identifying parts of the interaction recording whose metadata items fulfill archiving criteria; and archiving parts of the interaction recording stored in the local storage whose metadata items fulfill the archiving criteria and deleting parts of the interaction recording from the local storage whose metadata items do not fulfill the archiving criteria.

20 Claims, 9 Drawing Sheets

300

| | |
|---|---|
| INITIATING AN INTERACTION RECORDING OF THE INTERACTION BETWEEN THE AGENT DEVICE AND THE CUSTOMER DEVICE, WHEREIN THE INTERACTION RECORDING COMPRISES METADATA ITEMS. | 302 |
| SETTING ARCHIVING CRITERIA FOR THE INTERACTION. | 304 |
| STORING ONE OR MORE PARTS OF THE INTERACTION RECORDING IN A LOCAL STORAGE. | 306 |
| IDENTIFYING PARTS OF THE INTERACTION RECORDING WHOSE METADATA ITEMS FULFILL THE ARCHIVING CRITERIA. | 308 |
| ARCHIVING PARTS OF THE INTERACTION RECORDING STORED IN THE LOCAL STORAGE WHOSE METADATA ITEMS FULFILL THE ARCHIVING CRITERIA AND DELETING PARTS OF THE INTERACTION RECORDING FROM THE LOCAL STORAGE WHOSE METADATA ITEMS DO NOT FULFILL THE ARCHIVING CRITERIA. | 310 |

FIG. 3

```
Recording policy example
{
    "groupIds": [ "SALES1],
    "direction": "outbound",
}
```

Match!

```
Call Event example
{
    "event-source": "avaya-CT,
    "groupIds": [ "SALES1],
    "direction": "outbound",
    "event-type": "startCall",
    "participants": [ "agent1", {externalParticipant}],
    "event-time": time
    "DNIS": +1 211 125 2222
    "ANI": +1 211 545 8874
    "CallId": 12345
    "business-data": [ ]
    "customer-consent": (false)
}
```

FIG. 8

Do_not_record policy example

{
"participants": [any],
"DNIS": any,
"groupIds": [ (health-care) ],
"direction": (any),
"business-data": [any],
"customer-consent": (true)
}

Match!

Call Event example

{
"event-source": *avaya-CT*,
"participants": [ "agent1" ],
"groupIds": [ "health-care" ],
"direction": "inbound",
"event-type": "startCall",
"event-time" : *time*,
"DNIS": +1 211 125 2222,
"ANI": +1 211 545 8874,
"CallId": *12345*,
"business-data" : {},
"customer-consent": true
}

FIG. 9

SYSTEM AND METHOD FOR INTELLIGENT AND CONDITIONAL CLOUD SCREEN RECORDING

TECHNICAL FIELD OF THE INVENTION

The present invention relates generally to the generation of interaction recordings, more specifically to the selective recording of interactions between a plurality of devices.

BACKGROUND OF THE INVENTION

Contact centers frequently record interactions, e.g. voice or video recordings of conversations between parties such as contact center agents and customers. Recordings of interactions are a valuable resource and may allow, for example, accommodating a request of a customer at a later point in time or to share information related to a customer with other agents that have not taken part in a previous customer agent interaction.

Some parties record around 40% of screen interactions and up to 100% of voice interactions with other parties, for example in interactions with agents of contact centers. Contact centers may record interactions with customers for evaluation of their quality management processes, for example to evaluate the behavior of an agent during a call or to evaluate feedback for an agent by giving an agent a score that represents the quality of the service an agent provided during an interaction.

The decision to start an interaction recording is typically taken at the beginning of an interaction and the decision to record an interaction is often based on pre-defined recording rules (e.g., team, skill and phone number-based rules). At this stage, certain information about the interaction, for example the reason for a voice call or video call, is still yet to be known.

Recordings of interactions while essential information on an interaction is missing may lead to interaction recordings of low value, which may require the recording of subsequent interactions, and e.g. contact centers may have to record more interactions than initially required to make sure the required information are recorded. Screen recording policies may be set to record for example 40% of the total number of interactions for a specific agent and require subsequent evaluation of the recordings, for example two evaluations per agent per week. Thus, long recording times of interactions recordings may lead to time-consuming evaluation of interaction recordings and ultimately higher costs for contact centers.

An alternative procedure for the recording of interactions is Record-On-Demand (ROD). ROD may allow contact centers and agents to start a recording of an interaction during an interaction. However, the interaction recording via ROD relies on manual recording and may only start once a ROD request is launched.

At present, there are no effective tools to record and store relevant parts of an interaction between two parties, e.g. a call between a customer and an agent of a contact center, resulting in ineffective evaluation processes of interaction reviews and increased storage requirements for recordings of interactions with limited or without valuable information. Thus, contact centers require large storage facilities including servers with large data volumes for the storage of interaction recordings. However, on average, contact centers only use about 3% of interaction recordings for quality management processes.

Therefore, there is a need to automatically manage interaction recordings of interactions between devices of parties.

SUMMARY OF THE INVENTION

Improvements and advantages of embodiments of the invention may include automatically managing interaction recordings of interactions between parties, e.g. an agent and a customer. Thereby, interaction recordings may be stored in temporary storage and archived in permanent storage when archiving criteria for the interaction recordings are met.

Embodiments include a conditional recording of interactions between parties, e.g. a call between a customer and an agent. The comparison of metadata items of interaction recordings with archiving criteria may allow identifying parts of interaction recordings that are archived in permanent storage. Embodiments include the generation of interaction recordings that are tailored to the archiving criteria set by the parties.

One embodiment may include a method of managing interaction recordings of an interaction between an agent device and a customer device, the method comprising: initiating an interaction recording of the interaction between the agent device and the customer device, wherein the interaction recording includes or is associated with metadata items; setting archiving criteria for the interaction; storing one or more parts of the interaction recording in a local storage; identifying parts of the interaction recording whose metadata items fulfill the archiving criteria; and archiving parts of the interaction recording stored in the local storage whose metadata items fulfill the archiving criteria and deleting parts of the interaction recording from the local storage whose metadata items do not fulfill the archiving criteria.

In one embodiment, the interaction recording includes a visual recording and an audio recording.

In one embodiment, metadata items of the visual recording fulfill the archiving criteria.

In one embodiment, archiving criteria for the interaction recording are set by one or more of: the customer device and the agent device.

In one embodiment, archived parts of the interaction recording are combined to a single interaction recording that fulfills the archiving criteria.

In one embodiment, archiving criteria are based on one or more of: agent behavior and agent scores.

In one embodiment, metadata items of the interaction recording are derived from one or more of: agent voice, agent screen, customer voice, and digital agent interactions.

In one embodiment, archived parts of the interaction recording are archived in combination with the corresponding metadata items for the interaction recording.

In one embodiment, an interaction recording is initiated at the beginning of the interaction between the agent and the customer device.

In one embodiment, an interaction recording is initiated during the interaction (ROD).

One embodiment may include a system for managing interaction recordings of an interaction between an agent device and a customer device, the system comprising: a computing device; a local storage; a memory; and a processor, the processor configured to: initiate an interaction recording of the interaction between the agent device and the customer device, wherein the interaction recording includes metadata items; set archiving criteria for the interaction; store one or more parts of the interaction recording in the local storage; identify parts of the interaction recording whose metadata items fulfill the archiving criteria; and archive parts of the interaction recording stored in the local storage whose metadata items fulfill the archiving criteria in the memory and deleting parts of the interaction recording from the local storage whose metadata items do not fulfill the archiving criteria.

One embodiment may include a method of archiving conversation recordings of an interaction between a plurality of devices, the method comprising: starting a recording of an interaction between a plurality of devices, wherein the recording of the interaction includes metadata items; storing the recording of the interaction in a local storage; establishing archiving conventions for the interaction; identifying parts or sections in the recording of the interaction whose metadata items fulfill the archiving conventions; and archiving sections of the recording of the interaction stored in the local storage whose metadata items fulfill the archiving conventions and deleting sections of the recording of the interaction stored in the local storage whose metadata items do not fulfill the archiving conventions.

These, additional, and/or other aspects and/or advantages of the present invention may be set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 depicts a flowchart of methods of managing interaction recordings of an interaction between an agent device and a customer device, according to some embodiments of the present invention.

FIG. 8 depicts a scheme for identifying parts of an interaction recording whose metadata items fulfill archiving criteria for archiving parts of an interaction recording that are stored in a local storage via a recording decision control that manages uploads of interaction recordings, according to some embodiments of the present invention.

FIG. 9 depicts a scheme for identifying parts of an interaction recording whose metadata items fulfill "do not record" archiving criteria for archiving parts of an interaction recording that are stored in a local storage via a recording decision control that manages uploads of interaction recordings, according to some embodiments of the present invention.

Figure 1:
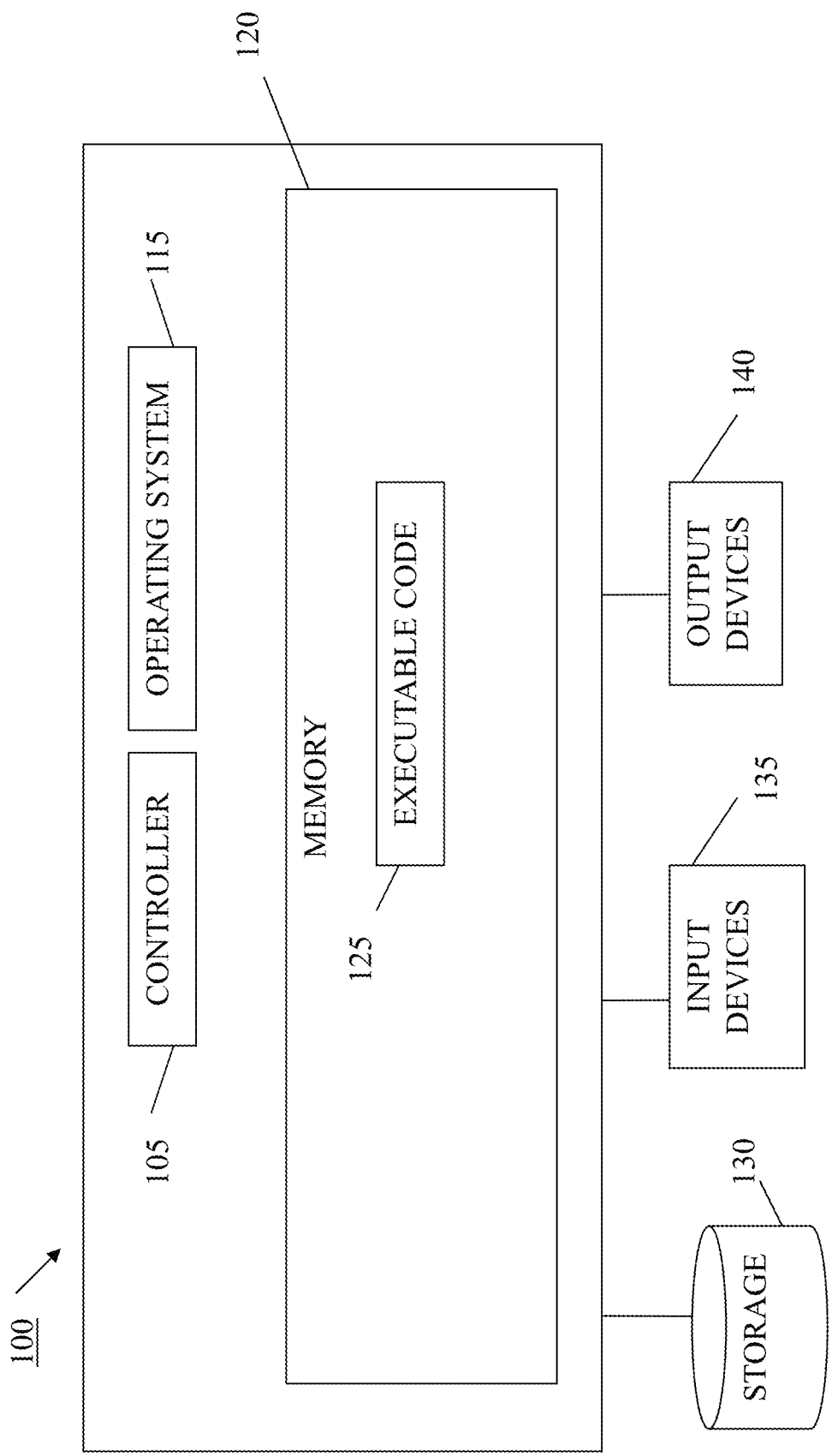
FIG. 1 shows a block diagram of an exemplary computing device which may be used with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

As used herein, "contact center" may refer to a centralized office used for receiving or transmitting a large volume of enquiries, communications, or interactions. The enquiries, communications, or interactions may utilize telephone calls, emails, message chats, SMS (short message service) messages, etc. A contact center may, for example, be operated by a company to administer incoming product or service support or information enquiries from customers/consumers. The company may be a contact-center-as-a-service (CCaaS) company.

As used herein, "call center" may refer to a contact center that primarily handles telephone calls rather than other types of enquiries, communications, or interactions. Any reference to a contact center herein should be taken to be applicable to a call center, and vice versa.

As used herein, "interaction" may refer to a communication between two or more people (e.g., in the context of a contact center, an agent and a customer), and may include, for example, voice telephone calls, conference calls, video recordings, face-to-face interactions (e.g., as recorded by a microphone or video camera), emails, web chats, SMS messages, etc. An interaction may be recorded. An interaction may also refer to the data which is transferred and stored in a computer system recording the interaction, the data representing the interaction, including for example voice or video recordings, metadata items describing the interaction or the parties, a text-based transcript of the interaction, etc. Interactions as described herein may be "computer-based interactions", e.g., one or more voice telephone calls, conference calls, video recordings/streams of an interaction, face-to-face interactions (or recordings thereof), emails, web chats, SMS messages, etc. Interactions may be computer-based if, for example, the interaction has associated metadata items stored or processed on a computer, the interaction is tracked or facilitated by a server, the interaction is recorded on a computer, data is extracted from the interaction, etc. Some computer-based interactions may take place via the internet, such as some emails and web chats, whereas some computer-based interactions may take place via other networks, such as some telephone calls and SMS messages. An interaction may take place using text data, e.g., email, web chat, SMS, etc., or an interaction may not be text-based, e.g., voice telephone calls. Non-text-based interactions may be converted into text-based representations (e.g., using automatic speech recognition). Interaction data may be produced, transferred, received, etc., asynchronously. For example, in a voice call, there may be periods of rapid conversation and other periods with no conversation (e.g., when an agent puts the customer on hold).

As used herein, "agent" may refer to a contact center employee that answers incoming interactions, and may, for example, handle customer requests.

As used herein, "supervisor" may refer to a contact center employee that, possibly among other responsibilities, mediates, supervises, or intervenes in contact center interactions. In some embodiments, a "supervisor" may not be a person at all, but rather a supervisor computer system.

As used herein, "real-time" or "real time" may refer to systems or methods with an event to system response time on the order of seconds, milliseconds, or microseconds. It may be preferable that the event to system response time is minimized, e.g., it is in the order of milliseconds or microseconds. In the context of the present invention, real-time may relate to a decision control service receiving metadata items and archiving criteria from e.g. a customer or an agent during an interaction such as a call while the interaction is still in progress, such that the decision control service may identify parts of the interaction recording whose metadata items fulfill the archiving criteria. The identification of parts of the interaction recording whose metadata items fulfill the archiving criteria and archiving parts of the interaction recording stored in the local storage whose metadata items fulfill the archiving criteria may proceed in a short amount of time after the interaction has started. In the following description, it is to be understood that systems and methods that are described as real-time embodiments may be embodiments that are suitable for real-time implementation, but which may additionally be suitable for implementation that is not in real time.

As used herein, "temporary storage" or "local storage" may refer to the storage of interaction recordings for a short period of time. Temporary storage or local storage may be local to a computing device that records an interaction recording or whose processor executes a recording control service. For example, in the case that an agent device records an interaction between an agent and a customer, an interaction recording may be stored in the storage of the agent device itself, as temporary or local storage. Alternatively, in the case that an interaction recording is initiated by a computing device, e.g. computing device 100 or 202, or is initiated by a recording control that is executed by a processor of a computing device, e.g. computing device 100 or 202, a recording may be stored in temporary storage of that computing device. Storage of interaction recordings for a short period of time may include storing of interaction recordings or parts of interaction recordings during the recording of an interaction. For example, interaction recordings may be stored in temporary or local storage at the same time when the interaction takes place. Storage of interaction recordings for a short period of time may also include a time period after an interaction recording has finished that is needed to evaluate the interaction recording and/or to assess whether the interaction recording should be stored in permanent storage or in an archive. Interaction recordings may be deleted from temporary storage or local storage once interaction recordings or parts thereof have been moved to permanent storage or to an archive, for example an interaction recordings database or an interactions recording server. Local storage may be contrasted with non-local storage: Non-local storage may be storage that is administrated by a computing device, e.g. computing device 230, that has not recorded an interaction recording or whose processor has not executed a recording control service to generate a recording, and which may be remotely located from the computing device that did generate the recording. For example, in contrast to local storage, non-local storage or permanent storage may be a server computing device and may be accessed by other computing devices that have not been involved in the generation of the interaction recording, e.g. other agent devices, to review interaction recordings.

As used herein, "archive" or "permanent storage" may refer to the storage of interaction recordings or parts thereof for a long period of time. Storage of interaction recordings or parts thereof for a long period of time may include storing of interaction recordings or parts of interaction recordings during the recording of an interaction. For example, interaction recordings or parts thereof may be stored in permanent storage or an archive at the same time when the interaction takes place when metadata items match archive criteria for interaction recordings or parts thereof. Storage of interaction recordings or parts thereof for a long period of time may also include a time period after an interaction recording has finished. Interaction recordings may be moved from temporary storage or local storage to permanent storage or an archive, for example an interaction recordings database or an interactions recording server.

FIG. 1 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of modules and equipment and other devices and modules discussed herein, e.g. a server such as server 230, computing device 202, agent device 210, customer device 220 recording control software or modules, and modules in FIGS. 2, 3, 4, 5, 6, 7 may be or include, or may be executed by, a computing device such as included in FIG. 1 although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIG. 3 according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by, for example, executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 2:
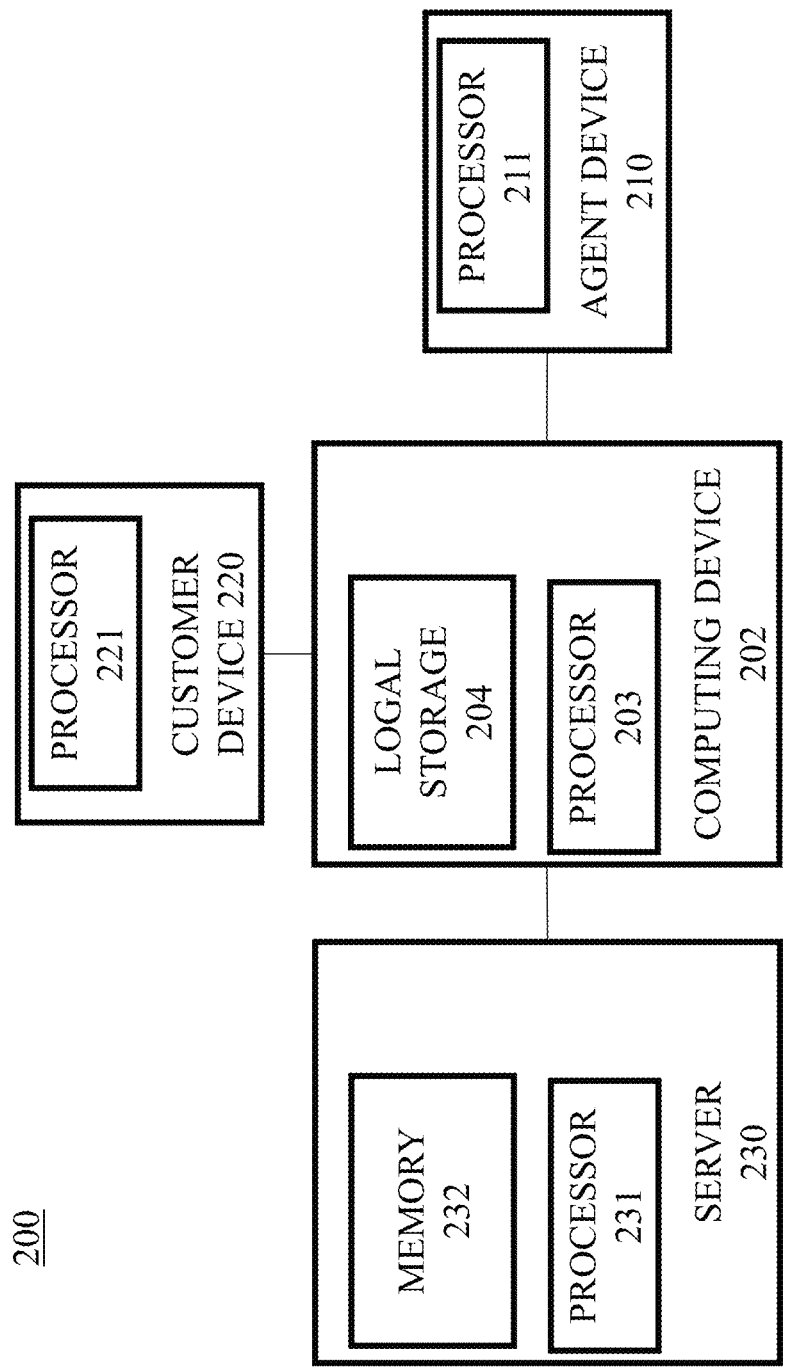
FIG. 2 is a schematic drawing of a system according to some embodiments of the invention.

FIG. 2 is a schematic drawing of a system 200 according to some embodiments of the invention. System 200 may include a computing device 202 comprising a processor 203 and temporary or local storage 204. Computing device 202 may be connected to an agent device 210 that includes processor 211. In one embodiment, computing device 202 may be connected to a plurality of agent devices 210. Computing device 202 may be connected to customer device 220. Customer device 220 may include processor 221. Computing device 202 may be connected to server 230. Server 230 may include processor 231 and memory 232. Server 230 may be a cloud server. Memory 232 may be used for non-local storage, e.g. for long term storage of data items and may be an archive of previously recorded data items.

Figure 4:
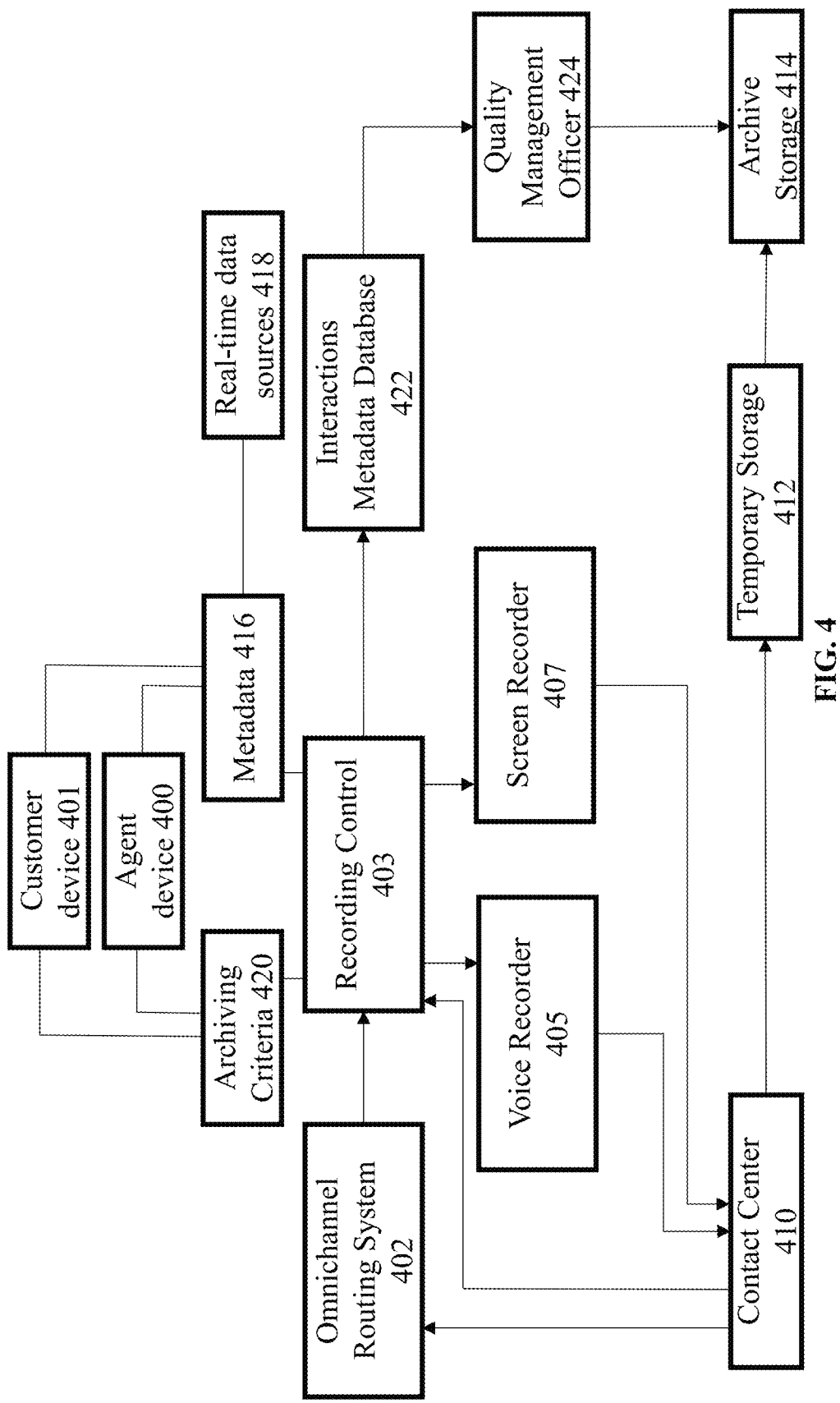
FIG. 4 depicts a dataflow diagram for managing interaction recordings of an interaction between an agent device and a customer device, according to some embodiments of the present invention.

Temporary storage or local storage may be local to, or within, a computing device, e.g. computing device 202 or 210, that records an interaction recording or whose processor executes a recording control service, e.g. recording control 403 as shown in FIG. 4. For example, in the case that an agent uses an agent device such as agent device 210 to record an interaction between them and a customer, an interaction recording may be stored in storage of agent device 210. Alternatively, in the case that an interaction recording is initiated by computing device 202, e.g. initiated by a recording control such as recording control 403 (as shown in FIG. 4) executed by processor 203 of computing device 202, a recording may be stored in temporary storage of computing device 202, e.g. local storage 204. Local storage may allow temporary storing of a recording of an interaction until a recording control service, e.g. recording control 403, has evaluated metadata items of the interaction recording and archiving criteria that have been set for the interaction recording and a decision has been made-based on comparison of metadata items to the archiving criteria-as to whether the interaction recording stored in local storage can be deleted or whether the interaction recording or parts of the interaction recording may be transferred from a local storage to a permanent, non-local storage. Non-local storage may be storage that is administrated by a computing device which may not have initially recorded an interaction recording or whose processor has not executed a recording control service to generate an interaction recording. For example, a server computing device such as server 230 may have memory 232 that can be used for permanently storing an interaction recording that may have been initially stored in a local storage, e.g. local storage 204 of computing device 202, by transferring an interaction recording or data items associated with the interaction recording from local storage 204 to memory 232. In contrast to local storage, non-local storage or permanent storage may be accessed by other computing devices, e.g. other agent devices to review interaction recordings.

Computing devices 202, 210, 220 and 230 may be servers, personal computers, desktop computers, mobile computers, laptop computers, and notebook computers or any other suitable device such as a cellular telephone, personal digital assistant (PDA), video game console, etc., and may include wired or wireless connections or modems. Computing devices 200, 210, 220 and 230 may include one or more input devices, for receiving input from a user (e.g., via a pointing device, click-wheel or mouse, keys, touch screen, recorder/microphone, or other input components). Computers 202, 210, 220 and 230 may include one or more output devices (e.g., a monitor, screen, or speaker) for displaying or conveying data to a user.

Any computing devices of FIGS. 1 and 2 (e.g., 100, 210, 220, and 230), or their constituent parts, may be configured to carry out any of the methods of the present invention. Any computing devices of FIGS. 1 and 2, or their constituent parts, may include a recording control, or another engine or module, which may be configured to perform some or all of the methods of the present invention. The systems and methods of the present invention may be incorporated into or form part of a larger platform or a system/ecosystem, such as customer relationship management (CRM) platforms or management platforms. The platform, system, or ecosystem may be run using the computing devices of FIGS. 1 and 2, or their constituent parts. For example, a processor such as processor 203 of computing device 202 and/or processor 211 of computing device 210 may be configured to initiate an interaction recording of the interaction between the agent device and the customer device, wherein the interaction recording includes metadata items. For example, a processor such as processor 203 and/or 211 may be configured to set archiving criteria for the interaction. For example, a processor such as processor 203 and/or 211 may be configured to store one or more parts of the interaction recording in a local storage 204. For example, a processor such as processor 203 and/or 211 may be configured to identify parts of the interaction recording whose metadata items fulfill the archiving criteria. For example, a processor such as processor 203 and/or 211 may be configured to archive parts of the interaction recording stored in the local storage 204 whose metadata items fulfill the archiving criteria and deleting parts of the interaction recording from the local storage 204 whose metadata items do not fulfill the archiving criteria.

FIG. 3 shows a flowchart of a method 300 for managing interaction recordings of an interaction between an agent device, e.g. agent device 210 and a customer device, e.g. customer device 220. The system displayed in FIG. 2 and the method shown in FIG. 3 refer to the management of interaction recordings between an agent device and a customer device, however, the system and the method may also be used to manage interaction recordings of interactions between one or more agent devices and customer devices. According to some embodiments, some or all of the steps of the method are performed (fully or partially) by one or more of the computational components, for example, those shown in FIGS. 1 and 2. Method 300 for managing interaction recordings may be executed by a processor of computing device 202, for example processor 203. An interaction recording may be a recording of a video call or phone call between an agent device of an agent and a customer device of a customer. An agent device may be, for example, a computing device, mobile phone or portable computing device such as computing device 100 or computing device 210. A customer device may be, for example, a computing device, mobile phone or portable computing device such as computing device 100 or computing device 220.

In operation 302, an interaction recording of an interaction between an agent device, e.g. agent device 210, and a customer device, e.g. customer device 220, may be initiated (step 302). An interaction or an interaction recording may include metadata items. Metadata items may be obtained from the interaction and may be derived from one or more of, for example: agent voice, agent screen, customer voice and digital agent interaction such as web chats, email conversations or messenger services. Metadata items may be data describing the interaction (as opposed to the data of the interaction itself), for example, pieces of information that may allow identifying a device associated with the interaction such as an agent device or customer device producing interaction data, to identify data items of active software that is executed on an agent device or customer device during the interaction, or to identify data items extracted from software interfaces that are shared between an agent device and a customer device during an interaction. Metadata items that may be obtained from a customer and/or agent device in an interaction may include, for example, agent sentiment, agent emotion, customer sentiment, customer emotion, agent desktop activity, agent voice volume, or customer overall satisfaction.

An interaction recording between an agent device and a customer device may include a visual or video recording (e.g. a recording of screen activity, screenshots, or video of a person talking) and optionally an audio recording. For example, the system, e.g. system 200, may record an interaction such as a video call between an agent and a customer. Alternatively, an interaction may also include an audio recording in addition to a visual recording. Alternatively, metadata items may be sent in addition to an interaction or as part of an interaction. For example, metadata items may include policies that set rules when an interaction can be recorded or if a recording of an interaction is prohibited. Computing device 100 or 202 may initiate an interaction recording when an interaction between parties, e.g. an agent device and a customer device, starts. Alternatively, computing device 100 or 202 may initiate an interaction recording in real-time at any point during an interaction recording between the parties, e.g. agent device 210 and customer device 220.

The decision to initiate an interaction recording or to initiate archiving of an interaction recording may be made by a service, e.g. a recording decision control 500 executed by processor 203 of computing device 202. Metadata items of an interaction and archiving criteria or rules may be compared to evaluate whether an interaction recording is started/stopped or whether an interaction recording is archived. For example, interaction metadata items may include data items that may be generated as a result of actions, for example actions that are initiated by an agent device or customer device such as real-time events that take place on the agent's screen. An interaction recording may be initiated at the beginning of the interaction, e.g. between an agent device and customer device. An interaction recording may be initiated during the interaction recording, e.g. between an agent device and customer device. In one embodiment, an agent device and/or a customer device may have to grant permission to start an interaction recording.

Events that take place on an agent's screen, that may be stored as part of interaction data, can be desktop inactivity, use of an invalid application, etc. The use of an invalid application may be an event that is not relevant in an interaction between an agent and a customer or should not be recorded, e.g. for data protection reasons.

Events in a customer agent interaction, that may be stored as part of interaction data, may include metadata items related to real-time events of an interaction, such as live scores that have been generated for an agent. For example, metadata items such as live scores may give an indication on the behavior of an agent during an interaction between an agent and a customer and assess/rate active listening, effective questioning or the level of empathy during an interaction. Recordings of interactions in which an agent obtained low scores for their behavior may be recorded and stored in long term storage, e.g. for training purposes of other agents.

Archiving criteria or rules may be automatically generated by the system, e.g. a recording policy web application. Alternatively, archiving criteria may be generated by a supervisor of an agent, for example using a recording policy web application. Based on the selected archiving criteria for an interaction, metadata items of an interaction recording, e.g. metadata items obtained during real-time events in an interaction between an agent device and a customer device, are evaluated against the set archiving criteria.

Some embodiments may include setting archiving criteria for the interaction (step 304). Archiving criteria for an interaction recording may be criteria that need to be fulfilled to transfer an interaction recording that is initially stored in temporary or local storage, e.g. local storage 204 of computing device 202 to long-term storage, for example memory 232 of server 230. Local storage may be storage of system 200 that may allow temporary storage of an interaction recording. For example, an interaction recording may be stored in local storage for the duration of an ongoing interaction recording and may be deleted shortly after the end of the interaction that is recorded. Long-term storage may be storage that is used to store interactions recordings that fulfill archiving criteria. Archiving criteria may be criteria that can be specified prior to an interaction or during an interaction between parties, for example an agent using agent device 210 and a customer using customer device 220. Archiving criteria may be conditions that are set by parties of an interaction, e.g. an agent or a customer. Archiving criteria may set conditions under which an interaction recording between parties can be archived and stored in long-term storage or whether an interaction recording must be deleted from local storage, for example immediately or after the end of an interaction. Archiving criteria may be based on call events, for example data protection policies for the recording of interactions, but can also be based on external events, for example keywords, content that is displayed on screen during an interaction or the behavior of an agent or customer during an interaction. Agent behavior and agent scores may be used to set archiving criteria or rules for an interaction. For example, an agent may be assessed for their behavior during an interaction, e.g. by assessing their active listening or their empathy, and a score is created.

Scores may be created or set, for example automatically by an analytics application, e.g. interaction events handler 503, that can analyze the behavior of an agent or customer during an interaction. Behavior of an agent during an interaction may be analyzed, for example, by classifying metadata items that indicate an agent's behavior during an interaction. Metadata items may be classed into classes of behavior, e.g.:

"effective questioning"—indicating whether or to what extent an agent uses questions that allow them to identify a customer's problem;

"empathy"—indicating whether or to what extent an agent reacts to a customer's problem showing empathy;

"active listening"—indicating whether or to what extent an agent shows interest and actively participates in the customer's explanation of a customer query;

"promote self-service"—indicating whether or to what extent an agent points a customer to a solution that a customer can use to solve a customer query;

"acknowledge loyalty"—indicating whether or to what extent an agent acknowledges that a customer uses a contact center's service to solve a customer query;

"Inappropriate action"—indicating whether or to what extent an agent asks questions that are unrelated to the customer's problem or puts an agent on hold during an interaction;

"demonstrate ownership"—indicating whether or to what extent an agent is able to use their own skills without receiving advice from a colleague in solving a customer query during an interaction;

"set expectations"—indicating whether or to what extent an agent provides a customer with expectations as to when or how a problem or a query can be solved; and "build rapport"—indicating whether or to what extent an agent is able to build up a customer relationship to a customer gaining trust of a customer in dealing with a query.

Scores may also be set by an agent's supervisor, using a quality management service.

Metadata items, e.g. a recorded voice of an agent or recognized words of an agent used in an interaction, may be detected by an analytics application, e.g. interaction events handler 503, and may be grouped into behavior classes. For each behavioral class for an agent, a score may be created. For example, an agent score between 0-10% may be strongly negative, a score between 10-35% may be moderately negative, a score between 35-65% may be neutral, a score between 65-90% may be moderately positive and a score between 90-100% may be strongly positive. The creation of scores for behavior classes may allow a customer or an agent to set archiving criteria for an interaction that are based on scores for one or more behavior classes.

For example, an application may assess an "inappropriate action" behavior class of an agent and the number of times a customer was put on hold by an agent may be counted. A number of 0 holds may be correlated to an agent score that is strongly positive, e.g. a score between 90-100%. The occurrence of more than 5 holds may be considered strongly negative, e.g. a score between 0-10%. A recording policy application may set an archiving criterium to archive interactions that show an agent score between 0-10% for a behavior "inappropriate action" that has been calculated from identified metadata items for a specific interaction.

An artificial intelligence based model may be trained, e.g. using voice samples, to recognize voices and spoken word of agents and customers, and may be able to identify emotions or behaviors of parties during an interaction, e.g. by correlating emotions or behaviors to prerecorded or learned emotions and behaviors. Thus, it may allow gauging customer's and agent's emotions during an interaction. For example, a positive emotion may result in a high score and negative emotion may result in a low score, e.g. a score scale may range from 1-5 and a score of 4 or 5 may be considered a high score, a score of 1 or 2 may be considered a low score and a score of 3 may be considered an average score. A calculated score for an agent may be compared to an average score that was calculated for an agent for a previous period in time, for example a month, or may be compared to an average score that was calculated for one or more other agents. In addition, scores for archiving criteria may be set in quality management processes, e.g. in evaluation processes of agents by a quality management officer 424. For example, based on requirements of a contact center, an archiving criteria may be set to a specific score for a behavior, such as 0-35% score for "active listening", and interactions in which agents achieved a 0-35% score for "active listening" may be recorded.

A score that reflects their ability for active listening or showing empathy may be calculated and assessed against a threshold score. For example, an archiving criteria may be an active listening score of lower than 70. Accordingly, when an agent has been rated within an active listening score of under 70, an archiving criterium-the active listening criterium-may be met and an interaction that corresponds to the score may be archived. Archiving criteria may be set prior to the start of an interaction, at any point during an interaction or after the interaction between parties, for example a customer device and an agent device ended. Archiving criteria may be set by a certain characteristic that has been identified by the system in an interaction between parties, e.g. between an agent device and a customer device. For example, an archiving criterium may be a device number of a customer device, a called phone number by an agent device or a customer identifier.

Some embodiments may include storing one or more parts of the interaction recording in a local storage (step 306). An interaction between parties such as customer device 220 and agent device 210 may be recorded in partial interaction recordings. Each section or part of the interaction recording may be an excerpt of the entire interaction recording and may be a snippet of the entire recording that corresponds to a specific time period of the interaction recording. A part of an interaction recording may be, for example, a second, 10 seconds, or a minute of an interaction. Computing device 100 or 202 may store one or more parts of the interaction recording in a local storage, for example on storage 130 of computer 100 or on a local storage 204 such as a hard drive of computing device 202. Alternatively, computing device 100 or 202 may store one or more parts of the interaction recording in any other form of local storage.

Some embodiments may include identifying sections or parts of an interaction recording whose metadata items fulfill or meet the archiving criteria or rules (step 308). The identification of parts of an interaction recording whose metadata items fulfill the archiving criteria may proceed in real-time. Alternatively, metadata items for parts of an interaction recording that have been stored on local storage, e.g. local storage 204, may be reassessed for a match with archiving criteria when archiving criteria have been amended at any point in time during an interaction and parts of an interaction recording whose metadata items fulfill the amended archiving criteria may then be archived, e.g. in permanent storage. For example, in the case that a customer initially set archiving criteria that did not allow to archive parts of an interaction recording in long term storage but during the interaction the customer decided to change archiving criteria to allow archiving of parts of the interaction recording, parts of the interaction recording from the beginning of the interaction whose metadata items fulfill the amended archiving criteria may be archived. Parts of an interaction recording may be moved from local storage and stored in long-term storage. Parts of an interaction recording whose metadata items fulfill the archiving criteria can also be identified after an interaction, for example in a specific time period after an interaction took place such as 10 minutes, 1 hour, 1 day or a week. In one embodiment, parts of an interaction recording whose metadata items fulfill the archiving criteria are identified immediately after an interaction ended.

Some embodiments may include archiving parts of the interaction recording stored in the local storage whose metadata items fulfill the archiving criteria and deleting parts of the interaction recording from the local storage whose metadata items do not fulfill the archiving criteria (step 310). The decision to initiate archiving of parts of an interaction recording may be taken in real-time. Archiving criteria may be set for an interaction prior to an interaction and during an interaction by an agent device or a customer device. In one embodiment, archiving criteria may be set by an external source. Temporally recording of an interaction recording in local storage may allow agent devices, customer devices or an external source to alter archiving criteria during the recording of an interaction and still generate an interaction recording that includes all parts of an interaction recording that fulfil the archiving criteria. In one embodiment, parts of the interaction recording stored in a local or temporary storage whose metadata items fulfill the archiving criteria are archived and parts of the interaction recordings from the local storage whose metadata items do not fulfill the archiving criteria are deleted, or simply not stored, in real-time during an interaction recording. Alternatively, parts of the interaction recording stored in the local storage whose metadata items fulfill the archiving criteria are archived and parts of the interaction recording from the local storage whose metadata items do not fulfill the archiving criteria are deleted after the interaction recording stopped.

Archiving criteria for an interaction may be criteria that are compared to metadata items which are included in the interaction recording. For example archiving criteria or rules can be conditional recording policies such as the use of a certain key word during an interaction. Parts of the interaction recording may be analyzed for metadata items that match the archiving criteria. A recording control, e.g. recording control 403 as shown in FIG. 4, may check whether metadata items of a visual recording of an interaction fulfills or meets archiving criteria. Fulfilling criteria may include that specific data in a part of an interaction, or in metadata, is equal to a criteria or within a range specified in criteria. For example, when metadata items include a keyword, e.g. when a keyword is shown on screen during a visual recording of a presentation that has been set as an archiving criterium, a part of an interaction recording that includes the match between metadata items and archiving criteria may be moved from local storage to permanent storage, e.g. an archive. Archiving criteria may be desktop activity of a customer and/or agent, recognition of active listening of a customer and/or agent, effective question by a customer and/or agent. Archiving criteria may be measured in real-time during an interaction. For example, an audio trace of an interaction may be analyzed in real-time during an interaction, e.g. a call, using voice recorder software such as voice recorder 405 and the audio trace may be analyzed for words or actions that are associated with active listening to create a score for active listening of an agent for an interaction or part of an interaction in real-time. In the case that the active listening score meets a recording criteria, e.g. is below a certain active listening threshold, the interaction or part of an interaction may be archived.

Parts of an interaction recording for an interaction may be archived in combination with corresponding metadata items for an interaction recording. Corresponding metadata items may be metadata items that have been recorded at the same time of the part of an interaction recording. For example, when a part of an interaction recording includes a visual recording, the recording may include dates and associated tasks of an agent such as calendar entries. Dates and associated tasks, e.g. calendar entries, of an agent may be metadata items that are extracted from the visual recording and may be archived with the part of the interaction recording that showed dates and associated tasks of an agent. An archive of interaction recordings, e.g. visual recordings, and corresponding metadata items may allow searching the archive for values, for example dates and may allow accessing a visual recording that corresponds to the values, such as dates. Thus, an archive of metadata items and corresponding interaction recordings makes interaction recordings searchable.

FIG. 4 is a high-level block diagram of an exemplary system, for example used in a contact center such as contact center 410 to manage interaction recordings of an interaction between agent devices and customer devices. For example, an embodiment of the system may be used to control the recordings of interactions between a customer, e.g. using customer device 401 or 220 (as depicted in FIG. 2) and an agent device, e.g. agent device 400 or 210 (as depicted in FIG. 2), according to embodiments of the present invention. An omnichannel routing system (ACD) 402 is an application that can handle recordings of interaction via recording control 403. Recording control 403 may be a decision logic for voice, screen, and digital interactions. Recording control 403 may initiate an interaction recording of an interaction between an agent device such as agent device 400 or 210 and a customer device such as customer device 401 or 220. Recording control 403 may receive archiving criteria 420 and metadata 416 or may set archiving criteria for an interaction recording from an agent device and a customer device. Recording control may receive metadata items 416 prior, during or after an interaction between a customer and an agent. Metadata items 416 may be metadata items that have been received from customer device 220 or agent device 210. For example, metadata items may include real-time data from a real-time data source 418. Recording control 403 may initiate voice recordings of interactions via voice recorder 405 or visual recordings of interactions via screen recorder 407. For example, voice recorder 405 may enable recording the voice of an agent via agent device 210. For example, screen recorder 407 may enable recording the screen of a customer via customer device 220. Interaction recordings or parts of an interaction recording generated by recording control 403, for example via video recorder 407, and optionally voice recorder 405 may be stored in a local storage, e.g. temporary storage 412 or local storage 204 of computing device 202. In one embodiment, interaction recordings may be sent to a local storage via contact center, e.g. contact center 410. Recording control 403 may identify parts of the interaction recording whose metadata items fulfill the archiving criteria and may archive parts of the interaction recording stored in the local storage whose metadata items fulfill the archiving criteria and delete, discard or not record parts of the interaction recording from the local storage whose metadata items do not fulfill the archiving criteria. Interactions recordings stored in temporary storage 412 may be archived in archive 414. Interaction recordings in stored in archive 414 may be periodically reviewed by a Quality Management service, for example Quality management Officer 424.

When an interaction, e.g. a call, between a customer device, such as customer device 401 or 220, and an agent device, such as agent device 400 or 210, is established, an ACD, e.g. ACD 402, may prompt a recording control service, e.g. recording control 403, to initiate an interaction recording of an interaction between the customer device and the agent device. For example, recording control 403 may start the screen recording of an interaction between agent device 210 and customer device 220 when a Computer Telephony Integration (CTI) event is received by recording control 403 and prompt screen recorder 407 to a start screen recording. A screen recording via screen recorder 407 may record a screen of an agent device, e.g. agent device 210. Screen recordings may be stored in temporary storage 412, for example local storage 204 of computing device 202. Screen recordings of an interaction may be stored in temporary storage 412 in parts of the screen recording for the whole interaction. A part of a screen recording may be a screen recording for a specified duration for example 1 second, 10 seconds or 1 minute. Screen recordings of parts of an interaction may be stored in temporary storage 412 until an archiving command from recording control 403 requests transfer of screen recordings of parts of an interaction to archive 414. A command to transfer screen recordings of parts of an interaction to archive 414 may be sent by recording control 403 in real-time during an interaction or at the end of an interaction. Optionally, an ACD may prompt a recording control service to initiate a voice recording of an interaction via a voice recorder, for example voice recorder 405. Voice recordings may be stored in temporary storage 412 in parts of the voice recording for the whole interaction. A part of a voice recording may be a screen recording for a specified duration for example 1 second, 10 seconds or 1 minute. However, since voice recordings require less storage than screen recordings, a voice recording of the entire interaction may be stored in permanent storage, e.g. archive 414. A recording control, e.g. recording control 403, may review metadata items that are received from a party, e.g. agent device 210 or customer device 220, during the interaction recording. In one embodiment, recording control 403 receives an interaction recording that includes or is associated with metadata items. For example, metadata items may be generated during real-time events that occur during an interaction between an agent device and a customer device and may be received by a recording control service, e.g. recording control 403. Metadata items of interaction recordings may be received from real-time data sources 418, e.g. from applications or interfaces of applications that are executed by a processor 211 of an agent device 210 or processor 221 of a customer device 220. In case that metadata items, e.g. metadata items 416, received at the recording control 403 matches archiving criteria 420 for an interaction, a part of an interaction for which a match between metadata items 416 and archiving criteria 420 is established is archived.

Parts of an interaction recording for which a match between metadata items and archiving criteria are established may be archived in real-time. For example, in case of a match between metadata items 416 and archiving criteria 420 for part of an interaction, recording control 403 may prompt a screen recorder 407 and optionally a voice recorder 405 to initiate archiving of the relevant part of an interaction that shows a match between metadata items and archiving criteria. Recording control 403 may also initiate to store metadata items in a database, e.g. interactions metadata database 422. Metadata items stored in an interactions metadata database 422 may be associated with an interaction recording from which they are derived, e.g. by using a common identifier that allows to match an interaction recording stored on local storage, e.g. temporary storage 412, and metadata items of interactions metadata database 422. An interaction recording control may establish a match between metadata items and archiving criteria for parts of an interaction. For example, a match between metadata items and archiving criteria may be evaluated every second, every 10 seconds, every minute. Accordingly, a part of an interaction recording may have a duration of an interaction of, for example, one second, 10 seconds or a minute.

During an interaction between two parties or when an interaction between two parties, e.g. customer device 401 and agent device 402, ends an interaction recording for the interaction is generated and archived, for example in a storage of computing device 202 or in a storage, e.g. memory 232, of cloud server 230. The interaction recording may be available for review, e.g. for evaluation by a quality management officer 424, e.g. an agent or supervisor of an agent.

Parts of an interaction recording, for example parts of screen recordings that are transferred from temporary storage, e.g. temporary storage 412, to permanent storage, e.g. archive 414, may be combined to provide a single screen recording of an interaction, for example a recording which includes portions of the original interaction meeting the criteria, and not including portions of the original interaction not meeting the criteria. Screen recordings may be stored in an archive for long-term storage with corresponding metadata items for an interaction. Storage of screen recordings and metadata items may allow an archive of recordings to be searchable.

Archiving of interaction recordings in combination with metadata items in long-term storage, e.g. in a database, may allow carrying out searches of the database for specific interaction recordings.

Thus, an embodiment of the system may allow generating a continuous interaction recording of an interaction. However, in one embodiment one or more interaction recordings are only moved from local, temporally storage to an archive for long-time storage once an archiving command is received. An archiving command may arise when archiving criteria match metadata items of an interaction recording as explained herein.

Figure 5:
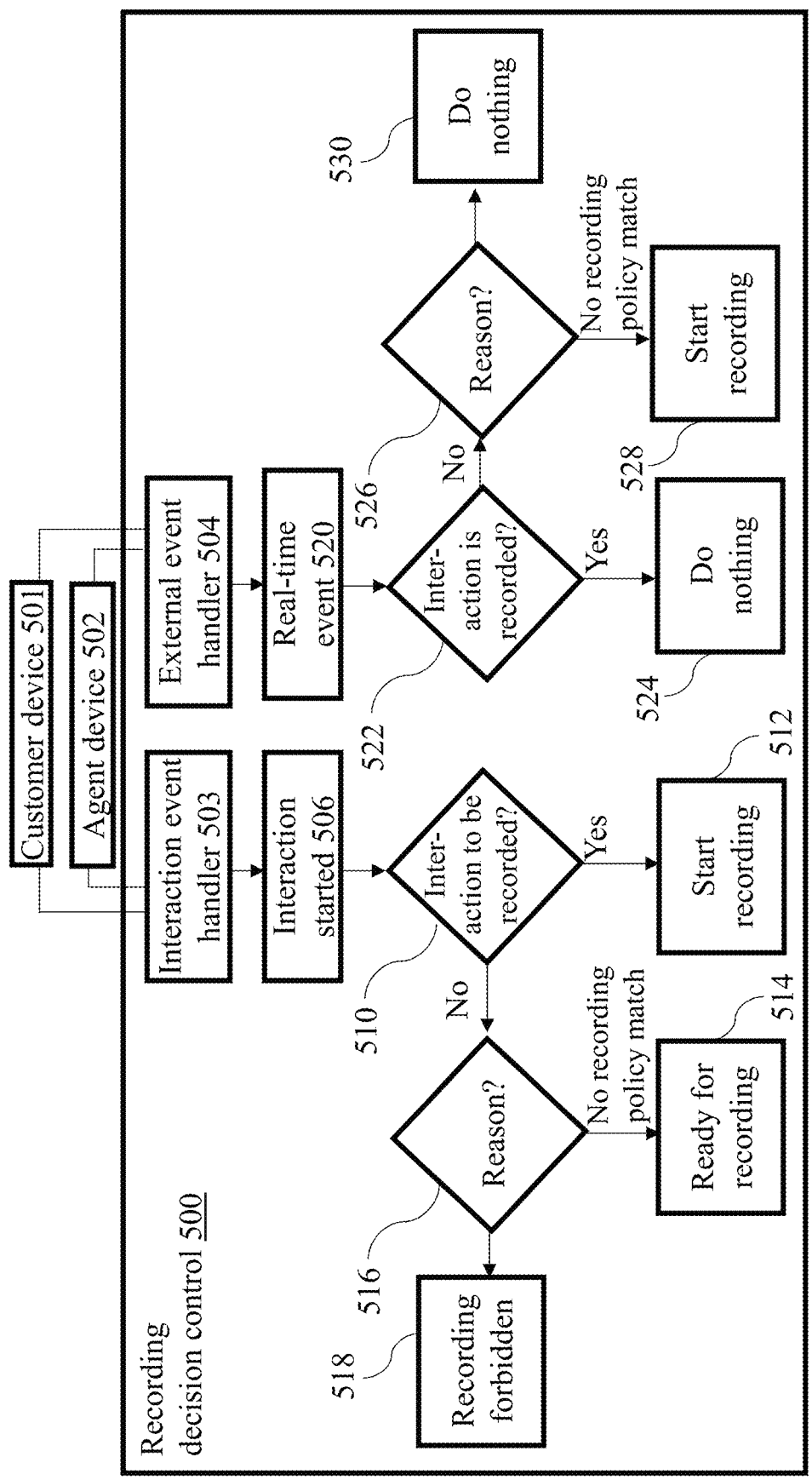
FIG. 5 depicts a dataflow diagram of a recording decision control for managing interaction recordings of an interaction between an agent device and a customer device, according to some embodiments of the present invention.

FIG. 5 is a high-level block diagram of a recording decision control module 500, for example used in a contact center, e.g. contact center 410, to control the recordings of interactions between a customer, e.g. using customer device 501 or 220 (as depicted in FIG. 2) and an agent device, e.g. agent device 502 or 210 (as depicted in FIG. 2), according to embodiments of the present invention. In one embodiment, a decision control, e.g. decision control 500, may receive interaction related events, for example interaction events 503, and external events, for example external events 504, from an agent device 502 or customer device 501 in real-time. Interaction events may relate to an interaction between a customer and an agent. For example, an interaction event may be the start of an interaction or the end of an interaction between a customer and an agent. External events may be events that are related to actions taken by the customer or agent. For example, an external event can be a call sentiment, agent/customer emotion, customer intent.

Interaction related events and external events may be differentiated by the recording-decision control, e.g. recording-decision control 500. For example, if an event is identified as originating from the telephony system, the event is passed to the call-events handler. If an event is identified as originating from an external events system, it may be passed to the real-time events handler.

Steps carried out by the interaction events handler 503 may include:
1. In the first step, an interaction event has arrived at the call event handler 503 of a recording decision control as a result of a start of an interaction 506.
2. Interaction events handler 503 evaluates metadata items and recording criteria, e.g. recording policies of an interaction to identify whether the interaction should be recorded (510).
3. In case of a match between metadata items and recording criteria, interaction events handler 503 may send a start record command 512 to a screen recorder, e.g. screen recorder 407 as shown in FIG. 4, and optionally to the voice recorder, e.g. voice recorder 405 as shown in FIG. 4.
4. In the case that no match between metadata items and recording criteria can be identified, the interaction event handler proceeds to identify reasons why the metadata items and recording criteria do not match (516).
   a. In the case that metadata items and recording criteria do not match e.g. due to privacy control (customer-consent) policy or lead to a "Do not record" policy, the interaction events handler keeps the current call state and no recording command is sent to the screen recorder and the voice recorder (518).
   b. In case that a mismatch of metadata items and recording criteria has been identified by interaction events handler 503, e.g. as a result of the previous recording policy, the interaction events handler must not send a start record command to the recorder (514).

Steps carried out by the interaction events handler 504 may include:

Once a decision has been made to record an interaction and metadata items have been received as part of an interaction and metadata items include an event such as an external event, an external events handler will handle the corresponding event:
5. In the first step, an event has arrived at an external events handler 504.
6. External events handler 504 evaluates whether the external event 520 includes metadata that matches the archiving criteria, e.g. that indicate an interaction recording demand as part of the external event (522).
7. If metadata items for the external event matches the archiving criteria and the call is already recorded, external events handler 504 may keep the interaction recording state and does not send an interaction recording command to a screen recorder and optionally a voice recorder (524).
8. In case that the external event does not match the archiving criteria, the external events handler 504 may identify reasons why an interaction, e.g. a call, is not recorded (526).
   a. In case that the call is not recorded because metadata items do not match the archiving criteria, e.g. due to match to privacy control (customer-consent) policy or as a result of a "Do not record" policy match, external events handler 504 may keep the current interaction recording state and must not sent recording command to the screen recorder and voice recorder (530).
   b. In the case that an interaction is not recorded because metadata items do not match the archiving criteria, e.g. due to mismatch with previous recording policy, external events 504 handler may send a start record command to the screen recorder, e.g. screen recorder 407 as shown in FIG. 4, and optionally the voice recorder (528), e.g. voice recorder 405 as shown in FIG. 4.

Figure 6:
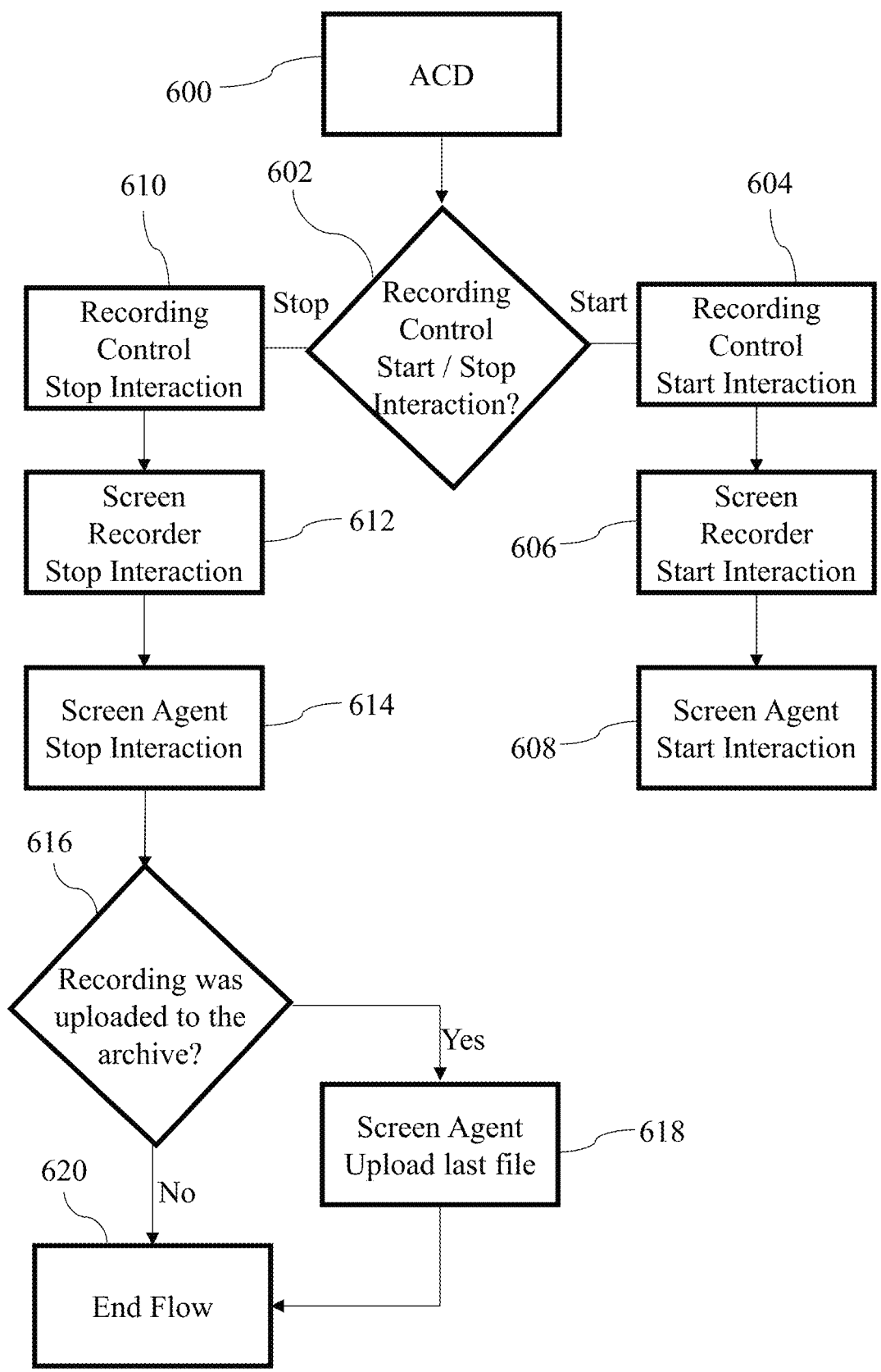
FIG. 6 depicts a dataflow diagram of an omnichannel routing system (ACD) for managing interaction recordings of an interaction between an agent device and a customer device, according to some embodiments of the present invention.

FIG. 6 shows a dataflow diagram for managing interaction recordings of an interaction between an agent device and a customer device.

An omnichannel routing system (ACD), e.g. ACD 402 or ACD 600, may initiate a recording of interaction via recording control 602, 403 as shown in FIG. 4 or 500 as shown in FIG. 5 between parties such as an agent device and a customer device. In case that the interaction should be recorded, a start interaction recording command 604 is sent to a screen recorder such as screen recorder 606 and optionally a voice recorder. Screen recorder, e.g. screen recorder 608 may connect to an ACD and will await receiving parts of the interaction recording, e.g. media packets. In one embodiment, screen recorder 608 may record parts of the interaction recording, e.g. a part of an interaction recording may include a recording of a specific time interval of an interaction recording such as 1 second, 10 seconds, 1 minute, 10 minutes. Parts of the interaction recording may be received by a contact center, e.g. contact center 410. Parts of the interaction recording may be stored in a local storage, e.g. local storage of computer 202.

When the interaction ends, the interaction recording of the interaction may be stopped (610). A stop interaction recording command may be sent to the screen recorder such as screen recorder 612 and optionally a voice recorder, e.g. via recording control 403, to stop an interaction recording of an interaction 614. When the interaction is stopped, a voice recorder may upload a recording to an archive 616. When the interaction is stopped screen recorder, e.g. screen recorder 612 may finalize storing the last part of the interaction recording in local storage. Parts of the interaction recording that have been stored in the local storage whose metadata items fulfill the archiving criteria are archived (618) and parts of the interaction recording from the local storage whose metadata items do not fulfill the archiving criteria are deleted (620). In one embodiment, parts of the interaction recording whose metadata items fulfill the archiving criteria may be combined to provide a single interaction recording that fulfills the archiving criteria. Metadata items that correspond to parts of the interaction recordings whose metadata items fulfill the archiving criteria may be archived. Archiving may be, for example, long-term storage of data as opposed to local storage of data that is deleted after an interaction.

Figure 7:
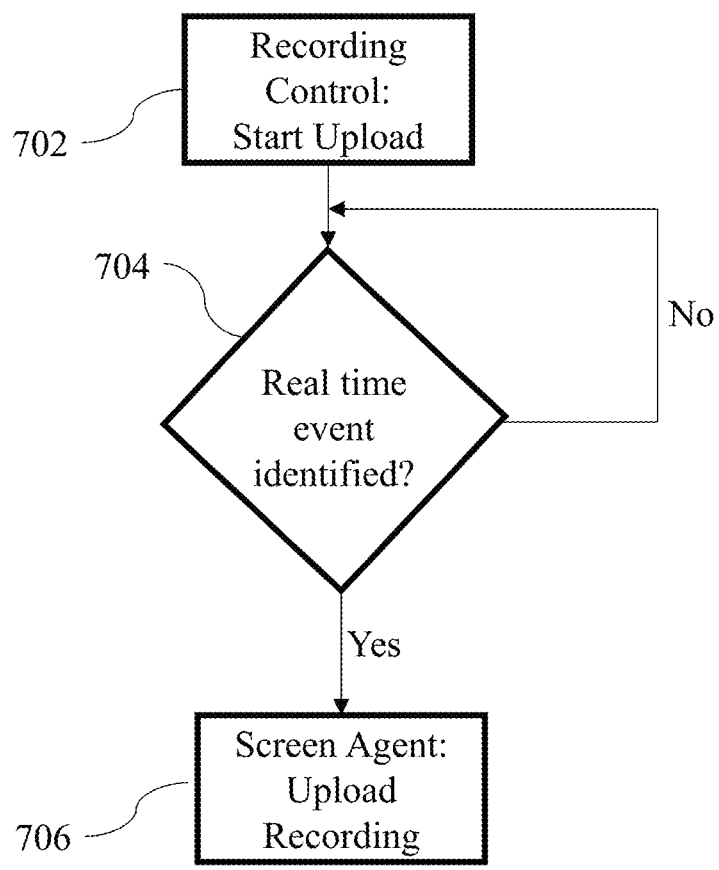
FIG. 7 depicts a dataflow diagram of a recording decision control for managing uploads of interaction recordings of an interaction between an agent device and a customer device into temporary and permanent storage, according to some embodiments of the present invention.

FIG. 7 depicts a dataflow diagram of a recording decision control 702, e.g. recording decision control 403 as shown in FIG. 4 or 500 as shown in FIG. 5, for managing uploads of interaction recordings of an interaction between an agent device and a customer device into temporary and permanent storage.

To store an interaction in an archive for long-term storage, the interaction's metadata items may be required to match the archiving criteria, e.g. a recording policy. In one embodiment, a match requires that the interaction's metadata items match the archiving criteria, e.g. the recording policy.

When the interaction's metadata items do not match any of the archiving criteria, the interaction is not stored in an archive for long-term storage. In the case that interaction metadata items fulfill the archiving criteria not to record an interaction, e.g. "do not record" policy or "customer consent", an interaction between an agent and a customer is not stored in an archive and recordings stored in the local storage are deleted after termination of the interaction.

In one embodiment, a recording control module of the system archives an interaction if the interaction's metadata items fulfils the archiving criteria and if the archiving criteria does not prohibit the recording control module from storing the interaction in an archive.

During the recording of an interaction, a recording control, e.g. recording control 403 or 700, may start uploading parts of an interaction recording to a temporary storage, e.g. temporary storage 412. At various points during the recording of an interaction, recording control 702 may check whether a real-time event occurred during the interaction in a part of an interaction recording that leads to a match between metadata items transferred during the interaction to the recording control (704) and archive criteria that have been set by the parties of an interaction, e.g. an agent device and a customer device (706). In the case that no real-time event has been identified in a part of an interaction recording, and, thus, no match between metadata items and archive criteria has been identified, recording control 403 or 702 may proceed with the preparation of an interaction recording and may continue uploading parts of an interaction recording to a temporary storage. In the case that a real-time event has been identified in a part of an interaction recording, and, thus, a match between metadata items and archive criteria has been identified, recording control 702 may proceed with the preparation of an interaction recording and may continue uploading parts of an interaction recording to a temporary storage and further recording control 702 may prompt screen agent to initiate an upload of parts of an interaction recording that show a match between metadata items received during the real-time event and archive criteria from temporary storage 412 to an archive, e.g. archive 414.

FIG. 8 depicts an example diagram for identifying metadata items of an interaction recording that fulfills the archiving criteria, according to some embodiments of the present invention.

An archiving criterium, for example a recording policy, may be compared via a recording decision control, e.g. recording control 403 or 702, to metadata items of an interaction, e.g. an interaction event such as a call event. Values for parameters of a recording policy such as "groupids" and "direction" may be compared to metadata items "groupids" and "direction" of a call event. In the present case, parameters "groupids" match for the value "SALES" and "direction" match for the value "outbound". Thus, as a result of the match, recording decision control may initiate recording of an interaction.

FIG. 9 depicts an example diagram for identifying metadata items of an interaction recording that fulfills "do not record" archiving criteria, according to some embodiments of the present invention.

An archiving criterium, for example a "do not record" policy, may be compared via a recording decision control, e.g. recording control 403 or 702, to metadata items of an interaction, e.g. an interaction event, e.g. a call event. For example, values for a parameter of a recording policy such as "groupids" and "customer-consent" may be compared to metadata items "groupids" and "customer-consent" of a call event. In the present case, parameter "groupids" matches for the value "health-care" and parameter "customer-consent" matches for the value "true". Thus, as a result of the match for "groupid" and "health-care", a recording decision control may not initiate recording of the interaction since the match fulfills the archiving criteria of a "do not record" policy.

Examples for data structures that may include metadata items and may be received by a computing device, e.g. computing device 202, at the beginning or during an interaction, for example in real-time, may include: a call event data structure, external Event data structure, recording policy data structure or do_not_record policy data structure.

Metadata items, e.g. metadata 416, of a call event data structure may be compared to archiving criteria such as archiving criteria 420, e.g. recording policies. An example for a call event data structure and its metadata items is shown below:

```
{
"event-source": telephony-system-name
"groupIds": [ {group1}, {group2},... {groupN}],
```

-continued

```
"direction": {inbound, outbound, internal},
"event-type": {startCall, endCall}
"participants": [ {agent1}, {agent2}, ..., {externalParticipant}]
"event-time": time
"DNIS": called number
"ANI": call number
"CallId": id
"business-data": [{BD1=value1}, {BD2=value2},...,{BDn=valueN}]
"customer-consent": {true, false}
}
```

Metadata items, e.g. metadata 416, of an external event data structure may be compared to archiving criteria such as archiving criteria 420, e.g. recording policies. An example for an external event data structure and its metadata items is shown below:

```
{
    "event-source": external-system-name
    "event-source": telephony-system-name
    "event-type": {sentiment, emotion, phrase-match}
    "event-specific-details": {details}
    "event-time": time
    "CallId": id
}
```

Metadata items, e.g. metadata 416, of a call event data structure or an external event data structure may be compared to archiving criteria such as archiving criteria 420, e.g. recording policies. An example for a recording policy data structure and its archiving criteria is shown below:

```
{
    "participants": [ {agent1}, {agent2},... {agentN}],
    "groupIds": [ {group1},{group2},... {groupN}],
    "direction": {inbound, outbound, internal},
    "business-data": [{BD1=value1}, {BD2=value2},...,{BDn=valueN}]
}
```

Metadata items, e.g. metadata 416, of a call event data structure or an external event data structure may be compared to archiving criteria such as archiving criteria 420, e.g. recording policies. An example for a do_not_record policy data structure and its archiving criteria is shown below:

```
{
    "participants": [ {agent1}, {agent2}],
    "DNIS": called number,
    "groupIds": [ {group1}, {group2},... { groupN}],
    "direction": {inbound, outbound, internal },
    "business-data": [{BD1=value1}, {BD2=value2},...,{BDn=valueN}]
    "customer-consent": {true, false}
}
```

The aforementioned flowcharts and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

What is claimed is:

1. A method of managing interaction recordings of an interaction between agent devices and customer devices, wherein the method comprises:
    initiating an interaction recording of the interaction between an agent device and a customer device, wherein the interaction recording comprises metadata items;
    storing one or more parts of the interaction recording in a local storage;
    identifying parts of the interaction recording whose metadata items fulfill archiving criteria;
    archiving parts of the interaction recording stored in the local storage whose metadata items fulfill the archiving criteria; and
    deleting parts of the interaction recording from the local storage whose metadata items do not fulfill the archiving criteria.

2. The method of managing interaction recordings according to claim 1, wherein the interaction recording comprises a visual recording and an audio recording.

3. The method of managing interaction recordings according to claim 1, wherein the archiving criteria for the interaction recording are set by one or more of: the customer device and the agent device.

4. The method of managing interaction recordings according to claim 1, wherein the archived parts of the interaction recording are combined to a single interaction recording that fulfills the archiving criteria.

5. The method of managing interaction recordings according to claim 1, wherein the archiving criteria are based on one or more of: agent behavior and agent scores.

6. The method of managing interaction recordings according to claim 1, wherein the metadata items of the interaction recording are derived from one or more of:
    agent voice, agent screen, customer voice, and digital agent interactions.

7. The method of managing interaction recordings according to claim 1, wherein the archived parts of the interaction recording are archived in combination with the corresponding metadata items for the interaction recording.

8. The method of managing interaction recordings according to claim 1, wherein the interaction recording is initiated at the beginning of the interaction between the one or more agent devices and customer devices.

9. The method of managing interaction recordings according to claim 1, wherein the interaction recording is initiated during the interaction.

10. The method of managing interaction recordings according to claim 1, wherein the metadata items that fulfill the archiving criteria are identified in real-time.

11. A system for managing interaction recordings of an interaction between agent devices and a customer devices, the system comprising:
    a computing device;
    a local storage;
    a memory; and
    a processor, the processor configured to:
        initiate an interaction recording of the interaction between an agent device and a customer device, wherein the interaction recording comprises metadata items;
        store one or more parts of the interaction recording in the local storage;
        identify parts of the interaction recording whose metadata items fulfill archiving criteria;
        archive parts of the interaction recording stored in the local storage whose metadata items fulfill the archiving criteria in the memory; and
    delete parts of the interaction recording from the local storage whose metadata items do not fulfill the archiving criteria.

12. The system for managing interaction recordings according to claim 11, wherein the interaction recording comprises a visual recording and an audio recording.

13. The system for managing interaction recordings according to claim 11, wherein the archiving criteria for the interaction recording are set by one or more of:
    the customer device and the agent device.

14. The system for managing interaction recordings according to claim 11, wherein the archived parts of the interaction recording are combined to a single interaction recording that fulfills the archiving criteria.

15. The system for managing interaction recordings according to claim 11, wherein the archiving criteria are based on one or more of: agent behavior or agent scores.

16. The system for managing interaction recordings according to claim 11, wherein the metadata items of the interaction recording are derived from one or more of: agent voice, agent screen, customer voice, and digital agent interactions.

17. The system for managing interaction recordings according to claim 11, wherein the archived parts of the interaction recording are archived in combination with the corresponding metadata items for the interaction recording.

18. The system for managing interaction recordings according to claim 11, wherein the interaction recording is initiated at the beginning of the interaction between the agent and the customer device when the agent device and the customer device grant permission for the interaction recording.

19. The system for managing interaction recordings according to claim 11, wherein the interaction recording is initiated during the interaction.

20. A method of archiving conversation recordings of an interaction between a plurality of devices, the method comprising:
- starting a recording of an interaction between a plurality of devices, wherein the recording of the interaction is associated with metadata;
- storing the recording of the interaction in a local storage;
- identifying sections in the recording of the interaction whose metadata items fulfill archiving conventions;
- archiving sections of the recording of the interaction stored in the local storage whose metadata items fulfill the archiving conventions; and
- deleting parts of the interaction recording from the local storage whose metadata items do not fulfill the archiving criteria.

* * * * *